United States Patent
Fukuda et al.

[11] Patent Number: 5,234,382
[45] Date of Patent: Aug. 10, 1993

[54] BELT DEVIATION CONTROL APPARATUS

[75] Inventors: Misao Fukuda; Yoshihiro Hayami, both of Hyogo; Toshihiro Ueda, Iwakura, all of Japan

[73] Assignee: Mitsuboshi Belting Ltd., Nagata, Japan

[21] Appl. No.: 798,636

[22] Filed: Nov. 26, 1991

[30] Foreign Application Priority Data

Nov. 28, 1990 [JP] Japan .................. 2-331202

[51] Int. Cl.⁵ .............................................. F16H 7/22
[52] U.S. Cl. ................................. 474/108; 474/124; 474/151
[58] Field of Search ............... 474/101, 102, 106–108, 474/119, 124, 131, 151, 259, 260, 261, 273; 51/326, 105 R, 106 R

[56] References Cited

U.S. PATENT DOCUMENTS

| | | | |
|---|---|---|---|
| 3,694,068 | 9/1972 | Jordan | 474/106 |
| 3,822,516 | 7/1974 | Huber | 51/326 |
| 3,823,614 | 7/1974 | Fava et al. | 474/102 |
| 3,891,405 | 6/1975 | Huber | 51/105 R |
| 3,973,446 | 8/1976 | Vasilantone | 474/107 |
| 4,178,094 | 12/1979 | Silverberg | 474/102 X |
| 4,322,916 | 4/1982 | Richmond | 51/326 X |
| 4,527,686 | 7/1985 | Satoh | 474/102 X |
| 4,629,061 | 12/1986 | Crandall | 474/102 X |
| 5,078,263 | 1/1992 | Thompson et al. | 474/102 X |
| 5,157,444 | 10/1992 | Mori et al. | 474/102 X |

*Primary Examiner*—Ramon S. Britts
*Assistant Examiner*—Roger J. Schoeppel
*Attorney, Agent, or Firm*—Wood, Phillips, VanSanten, Hoffman & Ertel

[57] ABSTRACT

An apparatus for limiting deviation of an endless belt/belt sleeve from a desired rotational path. The apparatus has first and second rollers each having a rotational axis and cooperatively supporting an endless belt/belt sleeve trained therearound for rotational movement in a predetermined path. A first member is mounted on one of the first and second rollers for movement axially relative to the one of the first and second rollers. A blocking structure defines a shoulder for engagement with an edge of an endless belt/belt sleeve trained around the first and second rollers to limit movement of an endless belt trained around the first and second rollers in a first axial direction relative to the one of the first and second rollers.

25 Claims, 3 Drawing Sheets

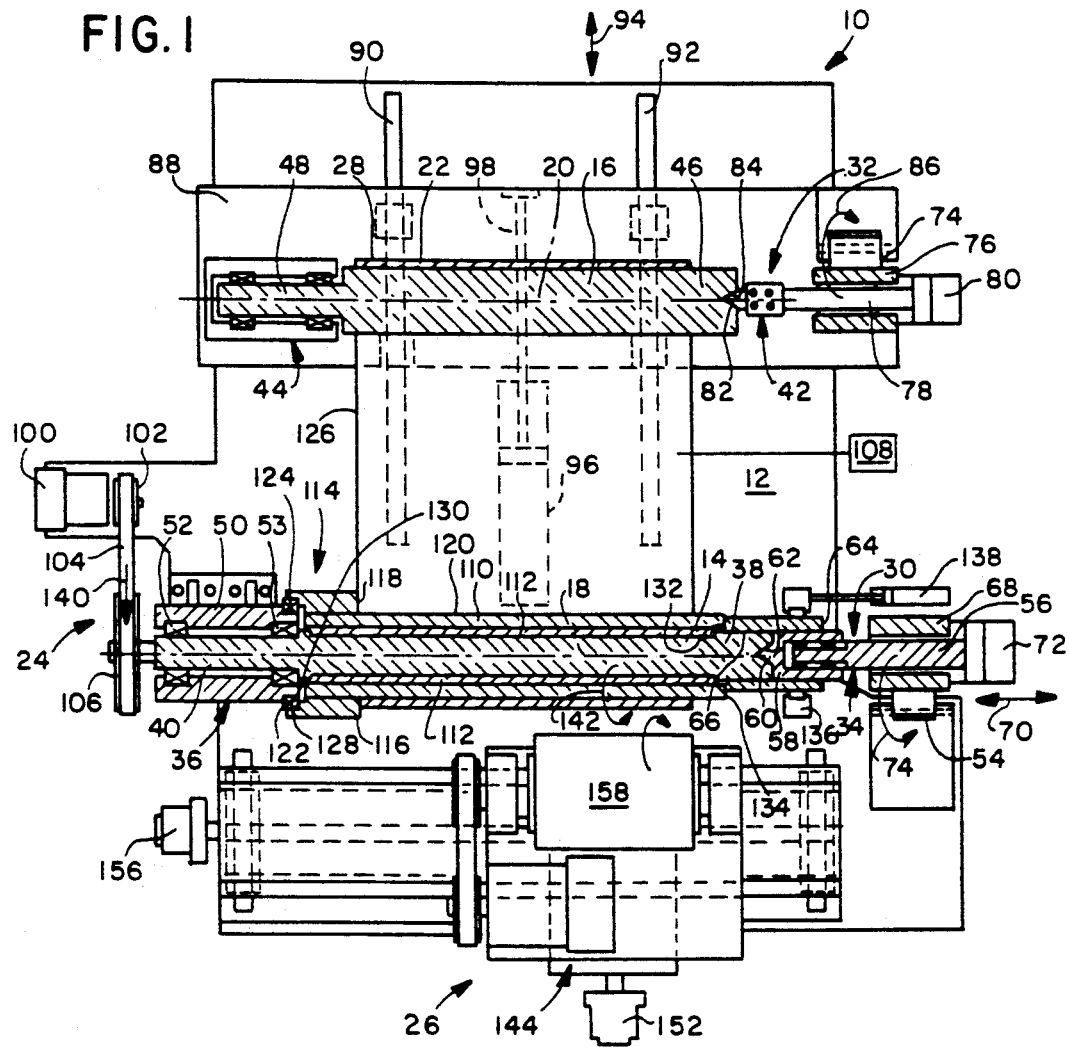
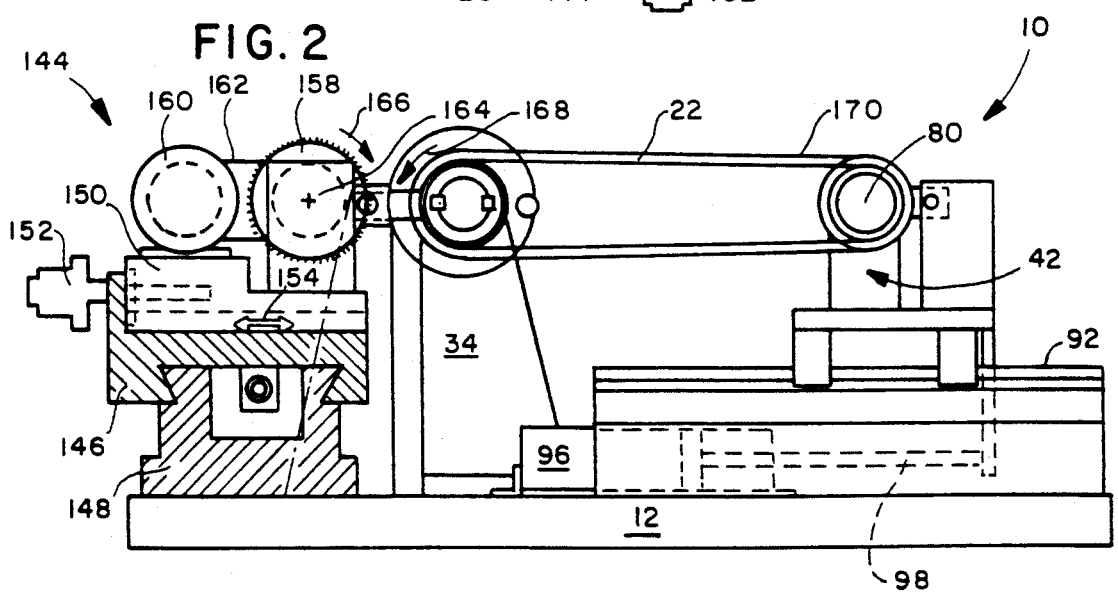

BELT DEVIATION CONTROL APPARATUS

BACKGROUND OF THE INVENTION

1. Field of the Invention

This invention relates to a system for mounting an endless belt/belt sleeve for rotational movement in an endless path around spaced rollers to allow a cutting/grinding operation to be performed thereon and, more particularly, to an apparatus for limiting deviation of the endless belt/belt sleeve from a desired rotational path. The invention is also concerned with the combination of the above system with an apparatus for cutting/grinding the rotating belt/belt sleeve as to make uniform the thickness thereof, define individual belts and/or define ribs in multi-ribbed belts.

2. Background Art

It is known to fabricate power transmission belts, such as multi-ribbed belts, by sequentially building components inside out on a forming drum. More particularly, an outer tension rubber layer, load carrying section and inside compression rubber layer are placed in turn on a forming drum to define a belt sleeve which is thereafter vulcanized. It is also known to rotate an endless sleeve formed by this method on a conforming drum and to define V-shaped grooves in the rotating belt sleeve by means of a grinder having a cutting surface that is complementary to the desired groove configuration in the belt sleeve. An exemplary system of this type is shown in Japanese Patent Publication No. 52-17552.

Multi-ribbed belts are commonly used in drive systems such as serpentine drive systems in automobiles. Typically, one very long belt drives numerous belt components. Since it would be impractical to use a conforming drum to support such a belt/belt sleeve, in that the radius would be unduly large, such belts are commonly formed by training a belt/belt sleeve around spaced rollers having parallel axes. One or both of the rollers are driven to effect rotation of the belt/belt sleeve The belt grooves are formed in the belt/belt sleeve using a grinding wheel similar to that used in forming side edges and grooves in a belt/belt sleeve carried by a forming drum. One of the rollers serves as a backing surface for the grinding wheel.

The above two forming methods are utilized not only on multi-ribbed belts but are also used to define the side surfaces of a conventional V-belt and to separate the individual belts from the belt sleeve using a cutter blade.

The above two techniques are utilized not only in defining individual belt/ribs but also in grinding the back surface of the belt/belt sleeve to produce a uniform thickness for the belt sleeve and the belts ultimately separated therefrom.

Particularly in the latter technique, in order to uniformly produce high quality belts, it is important to limit the deviation of the endless belt/belt sleeve from a predetermined rotational path around the two rollers. This objective is commonly frustrated by the load-carrying cords defining the neutral belt axis. Typically, a plurality of laterally spaced load-carrying cords are embedded in a rubber layer. The individual cords are conventionally made from twisted fibers and naturally bias the belt in a direction that depends on the direction of winding i.e. whether the twisted cords are "S-type" or "Z-type". When an individual belt/belt sleeve is trained around spaced rollers, there is a tendency of the belt/belt sleeve to shift laterally depending upon the twist direction. Further, any inclination of the load-carrying cords can produce the same undesirable result.

The result of the above lateral shifting is that the individual belt dimensions may vary from one to the next. This problem is particularly prevalent using conventional grinding techniques. By such techniques, the grinding wheel is urged against the rotating belt sleeve to cut/grind a portion thereof. Once that portion of the belt sleeve is formed, the grinding structure is retracted and shifted laterally to progressively form the belt sleeve. As long as the grinding wheel or cutter is pressed against the belt sleeve, the lateral shifting is minimized. However, once the cutting/grinding element is retracted fully from the belt sleeve, there is a tendency of the freely rotating belt sleeve to shift laterally as a result of the bias from the load-carrying cords. Further, the cut/ground portion of the belt sleeve become more flexible than the remainder of the belt sleeve which may lead to shifting of the belt sleeve. The result of this is that the width of the belts and/or ribs cut/ground out of the belt sleeve may be irregular.

One proposed solution to the above problem has been to alternatingly wrap "S-type" and "Z-type" load-carrying cords during formation of the belt sleeve. While alternating cords can alleviate the shifting problem to a certain extent, it does not provide a solution in a belt sleeve wherein a cord is continuously wound. The cords are slightly inclined to produce a spiral arrangement which results in a lateral bias on the belt sleeve. In this case, the alternating arrangement of "Z-type" and "S-type" cords does not provide an adequate solution to belt deviation during belt rotation As an alternative solution, it is known to provide a raised crown on at least one of the rollers in the spaced roller pair The crown surface tends to block lateral shifting of the belt/belt sleeve. However, there is also a tendency of the belt/belt sleeve to bend radially outwardly to conform to the crown surface. The result is deformation of the belt sleeve and the individual belts formed from that part of the belt sleeve adjacent to the laterally opposite edges thereof.

SUMMARY OF THE INVENTION

The present invention is specifically directed to overcoming the above-enumerated problems in a novel and simple manner.

According to the invention, an apparatus is provided for limiting deviation of an endless belt/belt sleeve from a desired rotational path. The apparatus has first and second rollers each having a rotational axis and cooperatively supporting an endless belt/belt sleeve trained therearound for rotational movement in a predetermined path. A first member is mounted on one of the first and second rollers for movement axially relative to the one of the first and second rollers. A blocking structure defines a shoulder for engagement with an edge of an endless belt/belt sleeve trained around the first and second rollers to limit movement of an endless belt trained around the first and second rollers in a first axial direction relative to the one of the first and second rollers.

With the above structure, an endless belt/belt sleeve that is trained around the first and second rollers and shifts axially relative to the one of the first and second rollers in the first axial direction encounters the shoulder on the blocking structure and is resultingly caused to be urged oppositely to the first axial direction and the first member moves oppositely to the first axial direction relative to the one of the first and second rollers to thereby relieve an axial force exerted on the shoulder by the belt/belt sleeve to thereby keep the belt/belt sleeve in a desired axial position in which the belt/belt sleeve contacts the shoulder with only a slight axial pressure. B preventing axial shifting of the belt/belt sleeve, consistent abrasion and/or cutting of the back surface of the belt can be carried out sequentially to result in the production of precision, high quality belts.

In one form of the invention, the first member is a sleeve that surrounds the one of the first and second rollers.

In a preferred form, the sleeve and the one of the first and second rollers are guided for relative axial movement by cooperating splines.

The blocking structure is preferably a collar that surrounds at least one of the first and second rollers and the first member. The collar is mounted for rotation relative to the one of the first and second rollers about a third axis.

In a preferred form, a frame is provided. There is supporting structure on the frame to maintain each of the first and second rollers in an operative position. There is further structure for moving at least one of the first and second rollers selectively towards and away from the other of the first and second rollers to allow selection of a desired tension on an endless belt/belt sleeve trained around the first and second rollers.

To facilitate placement of an endless belt/belt sleeve on, and removal of a belt/belt sleeve from, the first and second rollers, a support is provided at each axial end of the first roller. The support is movable between an operative position and a setup position, with the latter allowing placement of the belt/belt sleeve over the rollers and removal of the belt/belt sleeve from the rollers. Preferably, the movement of the support is a pivoting movement. In a preferred form, a movable support is provided at the same axial end of each of the first and second rollers.

The invention further contemplates use of the above described structure in combination with a mechanism for cutting/grinding an endless belt/belt sleeve that is trained around the first and second rollers. The cutting/grinding mechanism has a rotatable grinding wheel with a grinding surface. In one form of the invention, there are diamonds adhered to the grinding surface which allow for high precision cuts and contribute to the longevity of the grinding wheel.

Another aspect of the invention is the provision of a cooling system for the grinding wheel to still further add to the life thereof. Additionally, heat buildup on the belt/belt sleeve is minimized which results in truer cuts. In one form, the grinding/cutting mechanism has a rotatable shaft with a grinding wheel thereon. Cooling fluid is directed controllably through the shaft and into heat exchange relationship with the grinding wheel.

In a preferred form, the grinding wheel has a rotational axis and a plurality of circumferentially spaced cutting projections/teeth. A plurality of the projections/teeth extend substantially in a line that is non-parallel to the grinding wheel axis.

With the inventive structure, a belt/belt sleeve is mounted around the first and second rollers by repositioning one or both of the roller supports to a setup position. With the belt/belt sleeve trained around the first and second rollers, the support(s) can be placed back in an operative position. The spacing of the first and second rollers can be selected to place a predetermined tension on the belt/belt sleeve. The belt/belt sleeve is urged by an aligning sleeve into abutting relationship with the shoulder on the collar. A predetermined pressure is applied to the aligning sleeve as through an hydraulic cylinder. The shoulder on the collar counteracts belt/belt sleeve movement axially toward the shoulder and shifts the first member/sleeve to relieve the axial force exerted by the belt/belt sleeve to thereby keep the endless belt/belt sleeve in its desired original position so that the belt/belt sleeve is consistently rotated in a desired rotational path in which the belt/belt sleeve contacts the collar shoulder with only a slight axial pressure. A pressure produced by the aligning sleeve is chosen to be sufficient to maintain the belt/belt sleeve edge in contact with the shoulder on the blocking collar. The belt/belt sleeve can then be consistently ground/cut in steps as it is rotated.

DETAILED DESCRIPTION OF THE DRAWINGS

FIG. 1 is a plan view of an apparatus for limiting deviation of an endless belt/belt sleeve from a desired rotational path according to the present invention;

FIG. 2 is a side elevation view of the apparatus in FIG. 1;

DETAILED DESCRIPTION OF THE DRAWINGS

Figure 3:
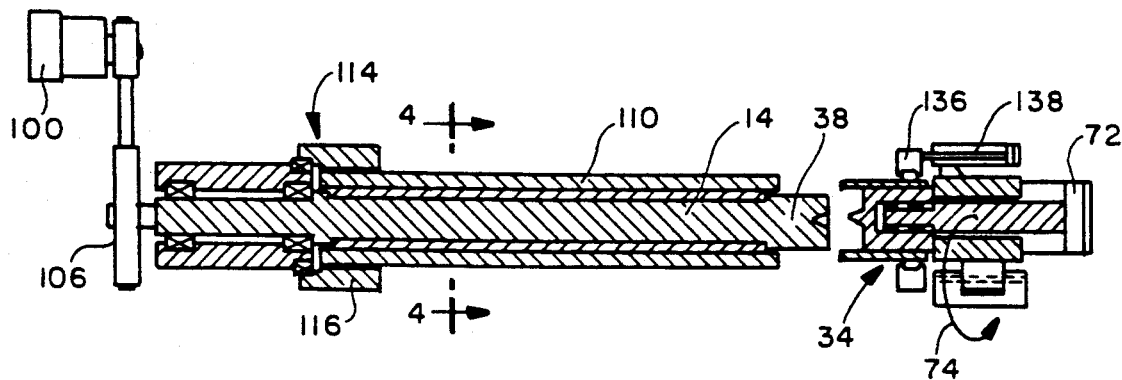
FIG. 3 is a plan view of a roller on the apparatus of FIGS. 1 and 2 for supporting an endless belt/belt sleeve and showing a support at one end of the roller in a retracted position.
Figure 4:
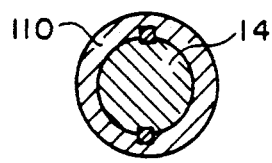
FIG. 4 is a cross-sectional view of the roller taken along line 4—4 of FIG. 3.

A preferred form of apparatus for limiting deviation of an endless belt/belt sleeve from a desired rotational path, according to the present invention, is shown at 10 in FIGS. 1–4. The apparatus consists of a frame 12 upon which first and second rollers 14, 16, respectively, are mounted. Each of the rollers 14, 16 has a rotational axis 18, 20, respectively, with the axes 18, 20 of the rollers 14, 16 being in spaced, parallel relationship so that an endless belt sleeve 22 can be trained therearound to rotate in a desired path.

Typically, the belt sleeve 22 is defined by sequentially building components up on a forming drum in inside out relationship. The belt sleeve 22 is then trained around the rollers 14, 16 and drawn to a predetermined tension. The first roller 14 is rotated by a drive mechanism 24. As the belt sleeve 22 is rotated, a grinding/cutting means 26, also mounted on the frame 12, is used to grind/cut the outside surface 28 of the belt sleeve 22 as to produce a uniform thickness for the belt sleeve 22, cut ribs in a multi-ribbed belt, and/or cut individual belts from the belt sleeve 22.

One aspect of the invention is a novel supporting structure for the belt sleeve 22. More particularly, the first roller 14 is mounted by a supporting means 30 and the second roller 16 by a supporting means 32 above the frame 12. The supporting means 30 has spaced supports 34, 36 for the opposite axial ends 38, 40 of the roller 14. Similarly, the supporting means 32 has supports 42, 44 for the spaced axial ends 46, 48 of the roller 16.

The end 40 of the roller 14 has a reduced diameter and is journalled for rotation in a bearing 50 on the support 36 by axially spaced idler rollers 52, 53.

The support 34 for the roller end 38 is releasable therefrom to allow mounting/dismounting of the belt sleeve 28 and/or disassembly of the roller 14. The support 34 has a base 54 which carries an elongate spindle 56 which supports the roller end 38. The spindle 56 has an end fitting 58 thereon with a conical support nose 60 that is received in a conical recess 62 in the end 38 of the roller 14. An alignment sleeve 64 surrounds the end fitting 58 and is freely rotatable relative thereto. The inside surface 66 of the alignment sleeve 64 and end fitting 58 cooperatively define a receptacle for the end 38 of the roller 14.

The base 54 has a bearing 68 which guides translation of the spindle 56 in the line of double-headed arrow 70 between an extended position, shown in FIG. 1, and a retracted position, shown in FIG. 3. A drive 72 on the spindle 56 moves the spindle 56 selectively between its extended and retracted positions. With the spindle 56 retracted, the support 34 can be pivoted in the direction of arrow 74 to allow unimpeded access to the roller 14 as to allow mounting and dismounting of an endless belt sleeve 22 on the apparatus 10.

The support 42 has a corresponding base 74 carrying a bearing 76 to support a spindle 78 for lengthwise movement towards and away from the end 46 of the second roller 16. The movement of the spindle is accomplished by a drive 80. The spindle free end 82 is conical for reception in a correspondingly configured recess 84 in the roller end 46. With the spindle 78 retracted from the position of FIG. 1, the support 42 can be pivoted in the direction of arrow 86 to a setup position in which access to the roller end 46 is unimpeded.

Mounting and dismounting of the belts is accomplished by first retracting each of the spindles 56, 78 and placing each of the supports 34, 42 in a setup position. The belt sleeve 22 can then be trained around the rollers 14, 16 after which the supports 34, 42 can be resituated to an operative position (see FIG. 1), after which the drives 72, 80 press the spindles 56, 78 against the ends 38, 46 of rollers 14, 16, respectively, so that the rollers 14, 16 are positively supported for rotation about their respective axes 18, 20.

The supporting means 32 includes a base 88 which is guided by spaced rails 90, 92 for translatory movement in the line of double-headed arrow 94. An hydraulic drive 96 has a drive cylinder 98 connected to the base 88 to drive the base 88 selectively towards and away from the roller 14. Once the belt sleeve 22 is trained around the rollers 14, 16, the drive 96 can be operated to place a desired tension on the belt sleeve 22.

To control the tension on the belt sleeve 22, an optional tensioning roller, shown schematically at 108, can be provided. The tensioning roller 108 acts on an unsupported portion of the belt sleeve 22 between the rollers 14, 16.

The drive mechanism 24 for the belt sleeve 22 consists of a drive motor 100 carrying a pulley 102 which drives a belt 104 trained around a pulley 106 mounted on the end 40 of the roller 14. The belt 104 is preferably a toothed belt for positive force transmission.

In the preferred embodiment, structure for limiting deviation of the belt sleeve 22 from a desired rotational path is provided on the roller 14. It should be understood that this structure could alternatively be provided on the roller 16 or on both of the rollers 14, 16.

More particularly, the inventive structure for preventing belt deviation includes a first member/sleeve 110 which surrounds the roller 14 and is keyed thereto against rotation as by splines 112 so that the sleeve 110 is slidable axially relative to the roller 14.

A belt blocking means is provided at 114 in the form of a cylindrical collar 116 having an axially facing blocking shoulder 118. The collar 116 surrounds the sleeve 110 adjacent to the end 40 of the collar 14. The collar 116 is spaced slightly in a radial direction from the outer surface 120 of the sleeve 110 so that the collar 116 is freely rotatable around the sleeve 110. The collar 116 is guided in rotation relative to the bearing 50 by an idler roller 122 interposed between the bearing 50 and an undercut surface 124 on the collar 116.

With the belt sleeve 22 operatively positioned on the rollers 14, 16, the collar shoulder 118 abuts the free edge 126 of the belt sleeve 22. As the belt sleeve rotates in operation, it causes the collar 116 to rotate about the axis 18. The collar 116 is prevented from moving axially towards the left in FIG. 1 by an annular shoulder 128 thereon, which abuts the idler roller 122 which, in turn, abuts an annular shoulder 130 on the bearing 50.

Upon the belt sleeve 22 drifting axially towards the left in FIG. 1, the edge 126 of the belt sleeve 22 bears against the collar shoulder 118. The shoulder 118 produces a counteractive axial force that tends to shift the sleeve 110 slightly relative to the roller 14 toward the right to relieve the axial pressure exerted by the belt/belt sleeve 22 on the position in which the belt sleeve 22 on the shoulder 118 to thereby keep the belt sleeve 22 in its desired original position in which the belt sleeve 22 contacts the shoulder 118 on the collar 116 with only a slight axial pressure sufficient to maintain the desired axial alignment of the sleeve 22.

It should be understood that while the collar 116 and blocking shoulder 118 defined thereby are shown at the end 40 of the roller 14, a like structure could be provided alternatively on the end 48 of the roller 16. A blocking collar could also be provided on each of the rollers 16, 18. A still further modification contemplated by the invention is the provision of a blocking shoulder at a location between, rather than on, the rollers 14, 16. The location of the shoulder 118 in FIG. 1 is preferred because a more positive force can be transmitted to the sleeve 110 with this arrangement so that the system is more sensitive and responsive to even minor belt deviations.

On the other end 38 of the roller 14, the alignment sleeve 64 prevents "walking" of the sleeve 110 as might otherwise be caused by system vibrations. The alignment sleeve 64 has an annular shoulder 132 which abuts a facing shoulder 134 on the sleeve 110. A control ring 136 surrounds the alignment sleeve 64 and is connected thereto so that the alignment sleeve 64 is freely rotatable relative to the ring 136 and follows axial movement of the ring 136. An hydraulic cylinder 138 selectively moves the control ring in the axial direction, indicated by double-headed arrow 70. The cylinder 138 causes a predetermined force to be exerted on the ring 136, and thus in turn the alignment sleeve 64, which is overcome by the counteractive force exerted by the shoulder 118 on the collar 116 upon the belt sleeve 22 deviating towards the left in FIG. 1. The force exerted by the cylinder 138 is sufficient to keep the sleeve 110 and belt sleeve 22 thereon in their desired axial position and, as previously mentioned, prevents axial movement of the sleeve 110 as when the sleeve 110 is subjected to vibrations during operation.

It should be understood that the sleeve 110 and related structure could be provided on the roller 16 instead of the roller 14 or, alternatively, such structure can be provided on both rollers 14, 16 in accordance with the present invention.

The operation of the apparatus 10 is as follows. The roller 16 is moved by the drive cylinder 98 towards he roller 14. The spindles 56, 78 are then retracted so that the supports 34, 42 can be moved to their setup position.

The belt sleeve 22 is then trained around the rollers 14, 16. The supports 34, 42 are returned to their operating position after which the spindles 56, 78 are extended to engage the ends 38, 46 of the rollers 14, 16, respectively, to thereby support the spindles 14, 16 securely for rotation about their axes 18, 20. At the same time, the cylinder 138 is operated to bring the alignment sleeve 64 into engagement with the sleeve 110 to thereby cause the edge 126 of the belt sleeve 22 to engage the shoulder 118 on the collar 116.

To tension the belt, the drive 96 is operated to move the base 88 away from the roller 14. Once the belt sleeve 22 is properly tensioned, the drive mechanism 24 is operated to move the belt sleeve 22 in the desired rotational path. The drive mechanism 24 moves the belt 104 in the direction of arrow 140 to thereby rotate the roller 14 in the direction of arrow 142.

Once the belt sleeve 22 deviates, i.e. moves towards the left in FIG. 1, a force is imparted by the sleeve edge 126 against the shoulder 118. This force is relieved by the shifting of the sleeve 110 alone toward thereby maintain the belt sleeve in its desired original Accordingly, the belt sleeve 22 can be consistently maintained in its desired original position in which the belt sleeve 22 contacts the shoulder 118 on the collar 116.

The system is arranged so that it counters belt deviation towards the left in FIG. 1. The belt sleeve 22 is thus mounted so that it naturally tends towards the left in FIG. 1. To ascertain the direction that a belt will deviate towards, the winding pattern for the load-carrying cords in the belt sleeve 22 is predetermined. A visual inspection of the belt will reveal this direction or, alternatively, a mark can be made on the belt sleeve 22 to indicate the direction of deviation during manufacture.

Dismounting of the belt sleeve 22 is accomplished by reversing the mounting steps. The spindle 56 must be retracted sufficiently that the alignment sleeve 64 is axially spaced from the end 38 of the roller 14.

The invention also contemplates the combination of the above described structure with a belt processing apparatus, shown at 144 in FIG. 1. The belt processing apparatus 144 may be a cutting or grinding mechanism to produce a uniform width belt, define ribs in a multi-ribbed belt, or define the side edges of individual V-belts.

More particularly, the belt processing apparatus 144 consists of an X-axis base 146 that is guided relative to a frame part 148 parallel to the roller axes 18, 20 and a Y-axis base 150 that is movable relative to the X-axis base 146 through a pulse motor 152 perpendicular to the roller axes 18, 20, as indicated by double-headed arrow 154. The X-axis base 146 is movable by a pulse motor 156.

The Y-axis base 150 carries a rotatable grinding wheel 158 which is driven by a motor 160 through an endless belt 162. The motor 160 drives the wheel about an axis 164 that is parallel to the axes 18, 20 of the rollers 14, 16 in the direction of arrow 166, which rotational direction is opposite to that for the rollers 14, as shown by arrow 168.

The belt processing apparatus 144 operates as follows. With the belt sleeve 22 mounted on the rollers 14, 16 and rotated by the drive mechanism 24, the grinding wheel 158 is caused to engage the outer surface 170 of the belt sleeve 22. At startup, the grinding wheel 158 is spaced slightly from the belt sleeve 22 on the roller 14 and moved by the motor 156 parallel to the roller axis 18 to align the grinding wheel 158 with that part of the belt sleeve 22 that is to be ground/cut. The motor 152 is then operated to move the grinding wheel 158 against the rotating belt sleeve 22 to effect the desired grinding-/cutting. Once the grinding/cutting is completed, the motor 152 is operated to retract the grinding wheel 158. The motor 156 is then operated to move the grinding wheel axially relative to the roller 14 and the process repeated to sequentially grind/cut the belt sleeve 22.

In a preferred form, the outer surface 120 of the sleeve 110 is coated with an elastic element (not shown) such as rubber, which facilitates cutting entirely through the belt sleeve 22 without damaging the sleeve 110, as when individual belts are being separated from the belt sleeve 22.

Still another aspect of the invention is a particular form of grinding wheel 158, shown in FIGS. 5-8. The grinding wheel 158 has a cylindrical body 172 and grinding projections/teeth 176 projecting radially outwardly from the body 172. The projections/teeth 176 are in linear arrangements which are spaced equidistantly around the periphery of the body 158. The lines of the projections/teeth 176 are non-parallel to the rotational axis 178 of the grinding wheel 158. The circumferential spacing L between adjacent lines of projections/teeth 176 is greater than the circumferential dimension L1 of the projections/teeth 176. The grinding projections/teeth have cutting surfaces 180 that are substantially an inverted V-shape in cross section to define grooves between adjacent ribs/belts. Between adjacent cutting surfaces 180 are spaces 182 which conform to the desired shape of the belt body/ribs.

To enhance the cutting characteristics of the grinding surface 180, diamond particles 184 are adhered to the surface 180.

Figure 5:
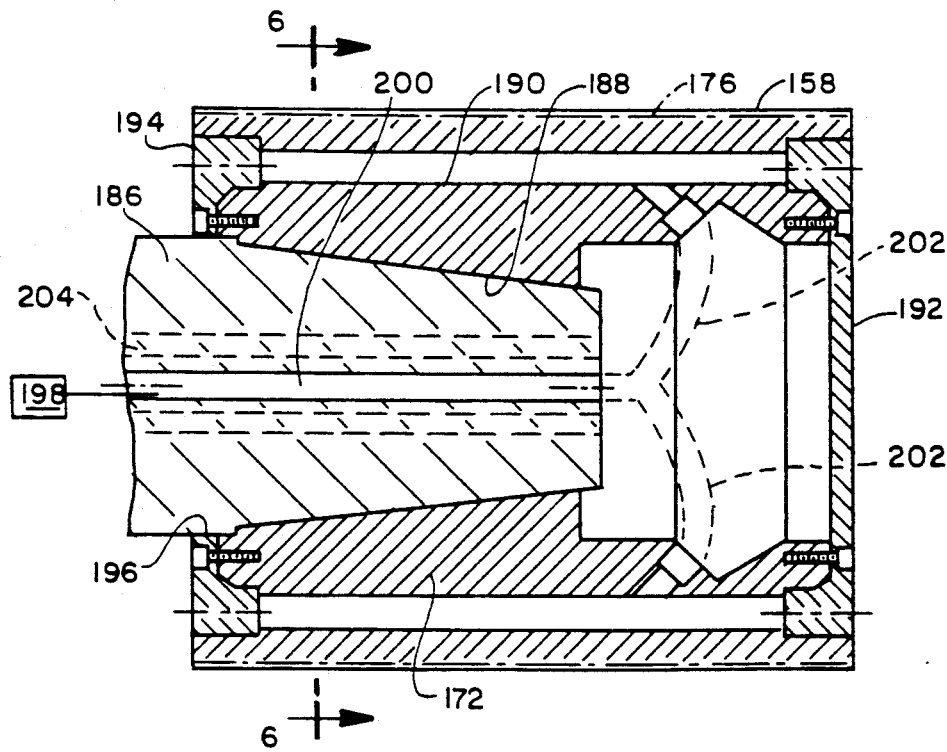
FIG. 5 is an enlarged, cross-sectional view of a grinding wheel according to the present invention useable to grind an endless belt rotated on the apparatus in FIGS. 2 and 2.
Figure 6:
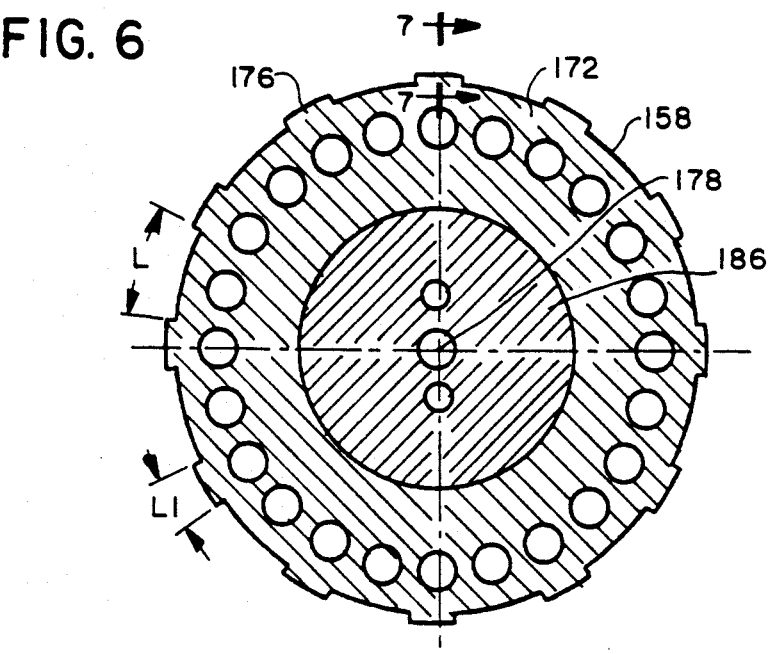
FIG. 6 is a cross-sectional view of the grinding wheel taken along line 6—6 of FIG. 5.
Figure 7:
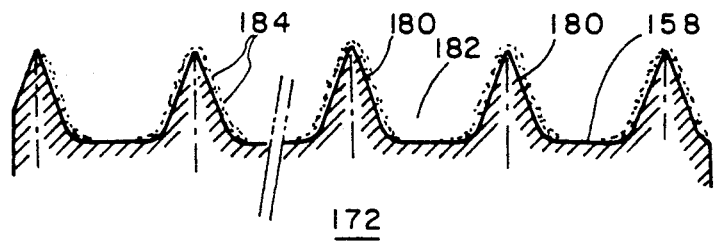
FIG. 7 is an enlarged cross-sectional view of cutting projections/teeth on the grinding wheel taken along line 7—7 of FIG. 6.
Figure 8:
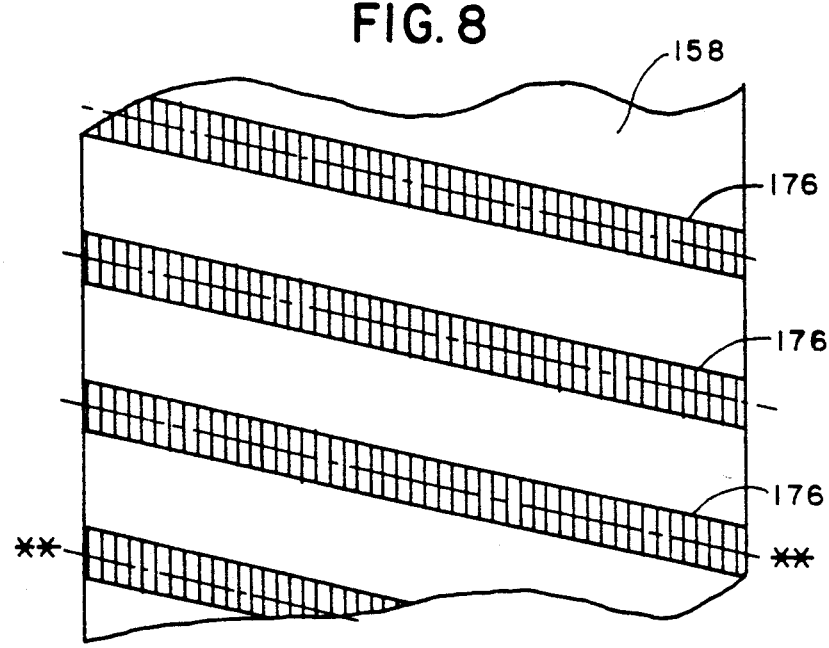
FIG. 8 is a fragmentary plan view of the cutting projections/teeth on the grinding wheel of FIGS. 5 and 6.

The invention also contemplates a cooling system for the grinding wheel 158. As seen in FIGS. 5 and 6, the grinding wheel 158 is mounted on a rotatable shaft 186. The grinding wheel body 172 has a stepped, central through bore 188 and, radially outwardly therefrom, a plurality of circumferentially and equidistantly spaced bores 190 defining fluid flow channels. An end cap 192 seals the bore 188 as well as the bores 190 at one end of the body 172. A separate end cap 194 seals the opposite end of the bores 190 and has an opening 196 therethrough for close reception of the shaft 186.

Cooling fluid from a supply 198 flows through a bore 200 in the shaft 186 into a plurality of curved pipes 202 which distribute the incoming flow to the bores 190. The fluid flowing in the bores 190 is in heat exchange relationship with the grinding projections/teeth 176 to effect cooling thereof. The fluid flows radially back inwardly through pipes (not shown) to an annular return passage 204 in the shaft 186. The circulating fluid prevents overheating of the cutting surface 180 on the grinding wheel 158. It is thus possible to operate the grinding wheel 158 at high speeds without excessive heat generation, which, in addition to prolonging the life of the grinding wheel 158, results in precision cutting/grinding.

The foregoing disclosure of specific embodiments is intended to be illustrative of the broad concepts comprehended by the invention.

We claim:

1. An apparatus for limiting deviation of an endless belt/belt sleeve from a desired rotational path, said apparatus comprising:

a first roller having a first rotational axis;

a second roller having a second rotational axis, said rollers together defining a means for supporting an endless belt/belt sleeve trained therearound for rotational movement in a predetermined path;

a first member;

means cooperating between the first member and at least one of the first and second rollers for mounting the first member for movement relative to the at least one of the first and second rollers axially in a direction substantially parallel to the axis of the at least one of the first and second rollers; and blocking means defining a shoulder for engagement with an edge of an endless belt/belt sleeve trained around the first and second rollers to limit movement of an endless belt/belt sleeve trained around the first and second roller in a first direction relative to the at least one of the first and second rollers that is substantially parallel to the axis of the at least one of the first and second rollers, whereby an endless belt/belt sleeve that is trained around the first and second rollers that shifts axially relative to the at least one of the first and second rollers in the first direction encounters the shoulder on the blocking means and is resultingly caused to be urged oppositely to the first direction and the first member moves oppositely to the first direction relative to the at least one of the first and second rollers to relieve a first axial pressing force exerted by said belt/belt sleeve on the shoulder to thereby keep the belt/belt sleeve in a desired position in which the belt/belt sleeve contacts the shoulder with an axial force less than the first axial pressing force.

2. The apparatus for limiting deviation of an endless belt/belt sleeve from a desired rotational path according to claim 1 wherein the first member comprises a sleeve that surrounds the one of the first and second rollers.

3. The apparatus for limiting deviation of an endless belt/belt sleeve from a desired rotational path according to claim 2 wherein there are cooperating splines on the sleeve and the one of the first and second rollers that guides relative axial movement between the sleeve and the one of the first and second rollers.

4. The apparatus for limiting deviation of an endless belt/belt sleeve from a desired rotational path according to claim 2 wherein the blocking means comprises a collar that surrounds at least one of the one of the first and second rollers and the first member.

5. The apparatus for limiting deviation of an endless belt/belt sleeve from a desired rotational path according to claim 4 wherein there are means mounting the collar for rotation relative to the one of the first and second rollers about a third axis.

6. The apparatus for limiting deviation of an endless belt/belt sleeve from a desired rotational path according to claim 1 including a frame and means for supporting each of the first and second rollers on the frame in an operative position in which the first and second roller axes are parallel, there being means for moving at least one of the first and second rollers selectively towards and away from the other of the first and second rollers to alter the tension on an endless belt/belt sleeve trained around the first and second rollers.

7. The apparatus for limiting deviation of an endless belt/belt sleeve from a desired rotational path according to claim 6 wherein the first roller has axially spaced ends and the supporting means includes supports at each axial end of the first roller and means for mounting the support at one axial end of the first roller for movement between an operative position and a setup position, said support at the one axial end of the first roller in its setup position allowing an endless belt/belt sleeve to be selectively placed around and removed form the first roller.

8. The apparatus for limiting deviation of an endless belt/belt sleeve from a desired rotational path according to claim 7 wherein the mounting means comprises means for mounting the support at the one axial end of the first roller for pivoting movement between its operative and setup positions.

9. The apparatus for limiting deviation of an endless belt/belt sleeve from a desired rotational path according to claim 1 in combination with a means for cutting an endless belt/belt sleeve trained around the first and second rollers, and means for controllably guiding the cutting means against an endless belt/belt sleeve trained around the first and second rollers.

10. The apparatus for limiting deviation of an endless belt/belt sleeve from a desired rotational path according to claim 9 wherein the cutting means includes a rotatable grinding wheel with a grinding surface and there are diamonds adhered to the grinding surface.

11. The apparatus for limiting deviation of an endless belt/belt sleeve from a desired rotational path according to claim 9 wherein the cutting means includes a rotatable shaft and a grinding wheel on the rotatable shaft and there are means for directing a cooling fluid through the rotatable shaft to the grinding wheel.

12. The apparatus for limiting deviation of an endless belt/belt sleeve from a desired rotational path according to claim 9 wherein the cutting means includes a grinding wheel having a rotational axis and a plurality of circumferentially spaced teeth.

13. The apparatus for limiting deviation of an endless belt/belt sleeve from a desired rotational path according to claim 12 wherein a plurality of the teeth extend substantially in a line that is non-parallel to the grinding wheel axis.

14. An apparatus for limiting deviation of an endless belt/belt sleeve from a desired rotational path, said apparatus comprising:

a first roller having a first rotational axis;

a second roller having a second rotational axis;

said rollers together defining a means for supporting an endless belt/belt sleeve trained therearound for rotational movement in a predetermined path;

a first sleeve;

means for mounting the first sleeve to one of the first and second rollers for movement relative to the one of the first and second rollers axially in a direction substantially parallel to the axis of the one of the first and second rollers upon a first predetermined axial force being applied to the sleeve;

means for applying a second predetermined axial force to said first sleeve in a first axial direction;

blocking means defining a shoulder for engagement with an edge of an endless belt/belt sleeve trained around the first and second rollers to limit movement of an endless belt/belt sleeve trained around the first and second rollers relative to the one of the first and second rollers in said first axial direction; and means for limiting movement of the shoulder on the blocking means in said first axial direction;

whereby an endless belt/belt sleeve that is trained around the first and second rollers that shifts in said first axial direction relative to the one of the first and second rollers encounters the shoulder on the blocking means and is resultingly caused to be urged oppositely to the first axial direction and resultingly the first sleeve moves oppositely to the first axial direction relative to the one of the first and second rollers into a desired position relative to the one of the first and second rollers to relieve a first axial pressing force exerted by the belt/belt sleeve on the shoulder to thereby keep the belt/belt sleeve in a desired position in which the belt/belt sleeve contacts the shoulder with an axial force less than the first axial pressing force.

15. The apparatus for limiting deviation of an endless belt/belt sleeve from a desired rotational path according to claim 14 including means for driving at least one of the first and second rollers in rotation about its respective axis.

16. The apparatus for limiting deviation of an endless belt/belt sleeve from a desired rotational path according to claim 14 wherein the force applying means comprises a second sleeve on the roller and hydraulic means for urging the second sleeve in said first axial direction.

17. The apparatus for limiting deviation of an endless belt/belt sleeve from a desired rotational path according to claim 14 wherein the blocking means comprises a collar that is mounted for rotation relative to an endless belt/belt sleeve trained around the first and second rollers about a third axis.

18. The apparatus for limiting deviation of an endless belt/belt sleeve from a desired rotational path according to claim 14 including a frame and means for supporting each of the first and second rollers on the frame in an operative position in which the first and second roller axes are parallel, there being means for moving at least one of the first and second rollers selectively towards and away from the other of the first and second rollers to alter the tension on an endless belt/belt sleeve trained around the first and second rollers.

19. The apparatus for limiting deviation of an endless belt/belt sleeve from a desired rotational path according to claim 18 wherein the first roller has axially spaced ends and the supporting means includes supports at each axial end of the first roller and means for mounting the support at one axial end of the first roller for movement between an operative position and a setup position, said support at the one axial end of the first roller in its setup position allowing an endless belt/belt sleeve to be selectively placed around and removed form the first roller.

20. The apparatus for limiting deviation of an endless belt/belt sleeve from a desired rotational path according to claim 19 wherein the mounting means comprises means for mounting the support at the one axial end of the first roller for pivoting movement between its operative and setup positions.

21. The apparatus for limiting deviation of an endless belt/belt sleeve from a desired rotational path according to claim 14 in combination with a means for cutting an endless belt/belt sleeve trained around the first and second rollers, and means for controllably guiding the cutting means against an endless belt/belt sleeve trained around the first and second rollers.

22. The apparatus for limiting deviation of an endless belt/belt sleeve from a desired rotational path according to claim 21 wherein the cutting means includes a rotatable grinding wheel with a grinding surface and there are diamonds adhered to the grinding surface.

23. The apparatus for limiting deviation of an endless belt/belt sleeve from a desired rotational path according to claim 21 wherein the cutting means includes a rotatable shaft and a grinding wheel on the rotatable shaft and there are means for directing a cooling fluid through the rotatable shaft to the grinding wheel.

24. The apparatus for limiting deviation of an endless belt/belt sleeve from a desired rotational path according to claim 21 wherein the cutting means includes a grinding wheel having a rotational axis and a plurality of circumferentially spaced teeth.

25. The apparatus for limiting deviation of an endless belt/belt sleeve from a desired rotational path according to claim 24 wherein a plurality of the teeth extend substantially in a line that is non-parallel to the grinding wheel.

* * * * *